S. RUST, Jr.
ELECTROPLATING WITH BRASS AND OTHER ALLOYS.
No. 98,110.                Patented Dec. 21, 1869.
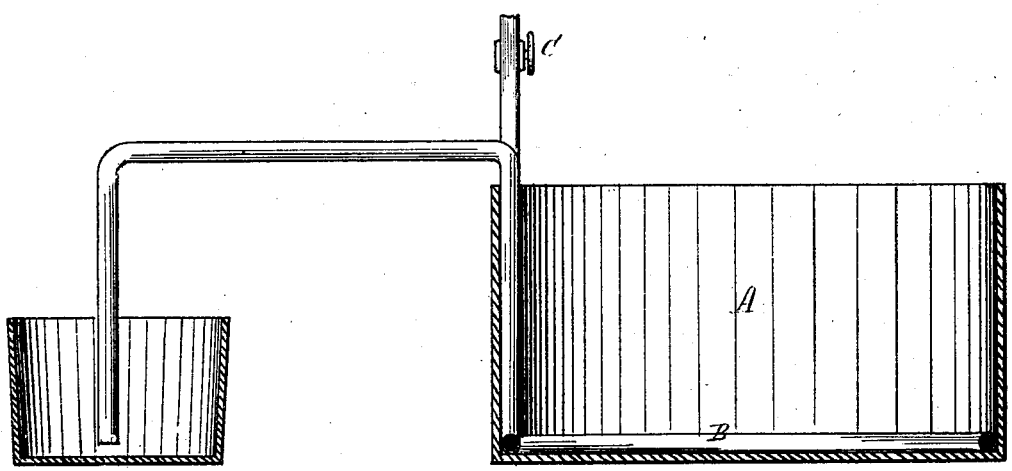
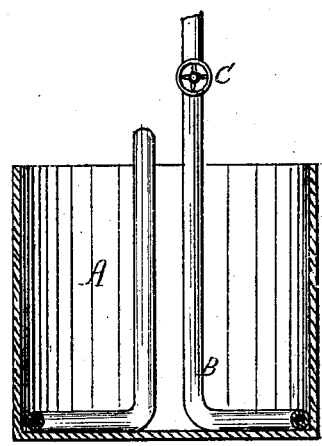

United States Patent Office.

SAMUEL RUST, JR., OF CINCINNATI, OHIO.

Letters Patent No. 98,110, dated December 21, 1869.

IMPROVEMENT IN ELECTRO-PLATING WITH BRASS AND OTHER ALLOYS.

The Schedule referred to in these Letters Patent and making part of the same.

*To all whom it may concern:*

Be it known that I, SAMUEL RUST, Jr., of Cincinnati, in the county of Hamilton, and State of Ohio, have invented a new and useful Method of Depositing Brass and other Alloys on Metallic and other Surfaces; and I do hereby declare that the following is a full, clear, and exact description thereof.

The nature of my invention consists—

First, in a new process of depositing brass and other alloys, by the electro-process, upon iron, zinc, and other metals;

Second, in a new article of manufacture, produced by the process herein described; and Third, in an apparatus hereinafter described, for carrying my said process into effect.

Hitherto, no practical method has been known of depositing uniformly and permanently the various alloys upon metallic and other surfaces, and my invention is intended to overcome this difficulty.

In carrying out my invention, I prepare a bath or depositing-solution in the following manner:

I take, of cyanide of potassium, one and one-quarter pound, and carbonate of ammonia, one and three-eighths pound, and dissolve in one gallon of distilled water.

I then take one-half ounce of sulphuret of carbon, and four ounces of cyanide of potassium, and mix with one pint of distilled water, shaking occasionally until the cyanide is entirely dissolved.

Of the last-named solution, I take one-half ounce and add to each gallon of the first-named solution of cyanide of potassium and carbonate of ammonia.

This composition I allow to stand for a period of time varying from twenty-four hours to three weeks, or as much longer as may be convenient.

I then decant off as much as possible of the clear liquid, and filter the remaining portion from the sediment, and place it in a proper vat or vessel for use.

I then take a porous vessel, of about the same height as the solution in the vat, and fill it with the same solution, and place it in the centre of the vat.

I hang a piece of brass or copper in the porous vessel, and connect it with the negative pole of a battery, and in the vat I place a sheet or sheets of fine brass, and connect with the positive pole.

I then put the battery in action, and allow it to remain until the required amount of brass or alloy is taken up or dissolved by the solution in the vat, after which the porous cell is removed, and the solution is ready for use, by depositing from it in the ordinary manner.

It is necessary, during the whole operation, to keep the solution at a temperature of about 180° Fahrenheit, which may be done by means of a sand-bath or otherwise. I prefer, however, to use an apparatus which I will proceed to describe.

In the drawings—

A represents the vat or vessel for holding the solution, and

B, a steam-coil passing around the bottom, for the purpose of heating the contents.

One end of said coil is connected with a steam-generator, and is provided with a stop-cock, C, for regulating the admission of steam.

The other end terminates in a vessel of water, or in the open air, as may be desired.

The articles to be coated are hung in the vessel A, which is filled with the depositing-solution, as above prepared, and are connected with the negative pole of the battery, and opposite them are suspended sheets of brass connected with the positive pole.

Upon putting the battery in operation, the deposition of the metal, or alloy, will commence, and the articles be uniformly and permanently coated.

It is evident that my process may be used for coating non-metallic articles, by covering them with a conducting-surface of black lead or metal, in the manner well known to electro-platers.

What I claim as my invention, and desire to secure by Letters Patent, is—

1. The process of electro-plating with brass or other alloy, substantially as herein described.

2. In combination with the solution of cyanide of potassium for preparing the depositing-bath, the employment of sulphuret of carbon, substantially as herein described.

3. The process of preparing the depositing-bath by dissolving the brass or other alloy directly by the electro-process in the solution of cyanide of potassium and sulphuret of carbon, substantially as herein described.

4. As new articles of manufacture, metallic or other articles coated with brass or other alloy by the process herein described.

5. The apparatus for heating the depositing-bath, consisting of the vat A and steam-coil B, substantially as herein described.

SAMUEL RUST, JR.

Witnesses:
J. C. COOMBS,
CHAS. D. COOMBS.